June 16, 1931.  H. F. STEVENS  1,810,376
CONTROLLING MEANS
Filed July 3, 1930
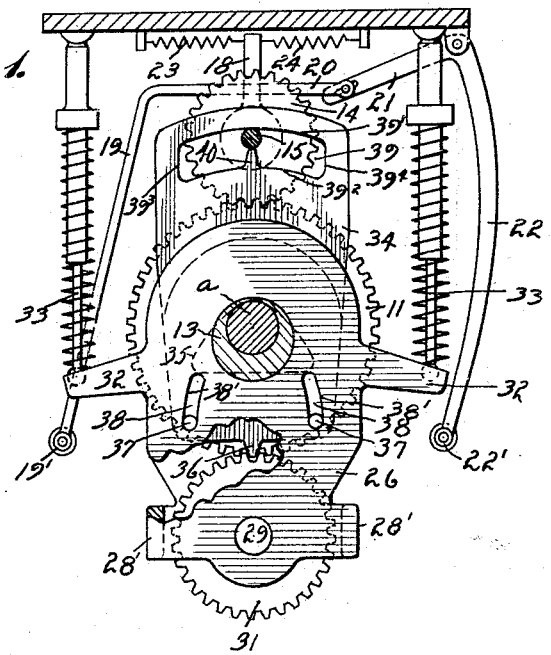
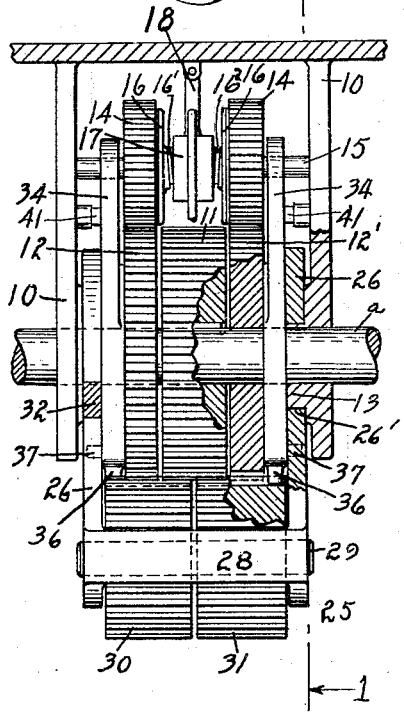
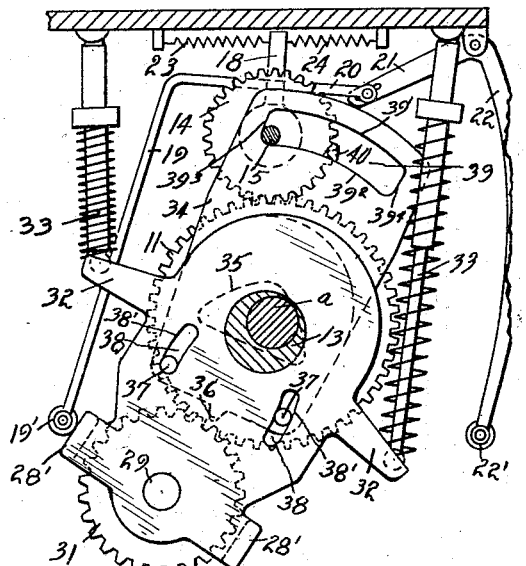
INVENTOR.
Horace F. Stevens
BY Max D. Ordmann
ATTORNEYS.

Patented June 16, 1931

1,810,376

UNITED STATES PATENT OFFICE

HORACE F. STEVENS, OF KENILWORTH, NEW JERSEY

CONTROLLING MEANS

Application filed July 3, 1930. Serial No. 465,490.

The present invention relates to means for controlling devices, either of mechanical or electrical nature used in connection with a moving or traveling element.

In my U. S. Patent 1,754,655 of April 15, 1930, I have described one form of device for such purpose. My invention as hereinafter described relates more particularly to improvements and refinements in the earlier described one and has for one of its objects the provision of means for making the device universal in its application.

A further object of the present device is the provision of means whereby clinching and consequent excessive and unnecessary wear of the toothed elements of my device are eliminated.

Still another object of my device is the provision of a device which may be manufactured at comparatively low cost.

With the above objects, the objects of my said U. S. patent and other objects in view as will be apparent from the following specification, my invention comprises the novel construction, combination and arrangement of elements to be hereinafter more fully described, shown and defined in the appended claims.

In the drawings which form part of this specification and in which similar reference characters denote corresponding parts:—

Fig. 1 is a sectional elevational view of my improved device taken along line 1—1 of Fig. 2.

Fig. 2 is a side elevational view partially in section; and

Fig. 3 is a view similar to Fig. 1 showing the operating elements in the position they occupy while the moving element is in operation.

The primary details of construction except as hereinafter mentioned may be similar with those described in my said U. S. Patent 1,754,655.

In the drawings $a$ denotes the driven rotary element which for instance in the case of a motor vehicle may be the propeller shaft. 10 denotes a stationary metal frame or casing bearing shaft $a$ and which may be suitably positioned to the frame of a vehicle or the like. Keyed or otherwise fixed on shaft $a$ is a gear or cog wheel 11 and loosely mounted on said shaft at one or at each side of said wheel 11 is a similar gear or cog wheel 12 of the same diameter as the gear 11. In the present example two loose gears 12 and 12′ are used. Fixed to or formed integrally with the inner faces of the side walls of the frames are rings or annular members 13 arranged slightly eccentrically relative to the axis of the shaft $a$. These members serve for oscillatory suspension of a toothed member to be presently described and which constitutes the control element proper. The loose gears 12 and 12′ are in constant meshing connection with a pinion or pinions 14 rotatably supported on spindle 15 revolubly mounted in side walls of the frame 10 to extend parallel to the driven shaft $a$. Cooperating with these pinions 14 are means adapted normally to influence the rotation of said pinions and consequently of the loose gears 12 and 12′ carried by the shaft $a$. These means may be brakes or the like that normally will retard the movement of the pinions 14 and gears 12, and 12′. In the present example I provide discs 16 which are centrally splined on the spindle 15 to be displaceable longitudinally thereof and each formed centrally with an inwardly extending externally threaded sleeve the threads on both sleeves running in opposite directions. Working on the threaded sleeves 16′ and 16² is a nut 17 formed correspondingly with oppositely running internal screw threads and having on its periphery a wing 18 to which may be fixed a bent rod member 19 which latter has a portion 19′ bent down into the path of the oscillatory member to be presently described. A short arm member 20 projects from the opposite face of said wing 18 and adapted to engage said member 20 is one end 21 of a double armed pivoted lever the other arm 22 of which has its free end 22′ bent downwardly into the path of said oscillatory member on the opposite side of axis $a$ as end portion 19′ of member 19, whereby when said oscillatory member rotates to engage the free end 22′ of arm 22, said nut will be rotated in the same direction as when said oscillatory member engages said rod 19.

Suitable springs 23 and 24 fixed to said frame and to opposite faces of said wing 18 tend to retain the latter in a neutral position from which the said nut may be rotated only by actuation of arm 19 or arm 22.

The control or oscillatory element comprises a substantially U-shaped frame 25 whose sides 26 are provided at their upper ends with enlarged openings 26' to fit around and rotatively bear on the circumference of the rings 13. Ball bearing support thereon may be used if desired to insure free rotation on said rings. The lower ends of said frame are joined by suitable cross pieces 28 which have noses 28' for engagement with the respective arm ends 19' and 22' when said frame is swung out of normal position into the respective operating positions.

When one of the said cross pieces is thrust against either arm end 19' or 22' the nut 17 is given a short turn as a result of which the brake discs 16, which normally owing to the action of spring 23 and 24 are held in frictional engagement with the sides of the pinions 14 and exert thereon a braking control, will be fed away from said pinions releasing the latter.

Suitably journaled between the ends 26 of said frame 25 is a spindle 29 and loosely mounted thereon or otherwise fixed are spur gears 30 and 31.

Gear 30 may be of length sufficient to mesh with gears 11 and 12 and gears 31 may mesh with gear 11 and gear 12'. Owing to the eccentric suspension of the members 26 on the rings 13 the teeth of gears 30 and 31 are adapted to but partially engage the teeth of said gears 11, 12 and 12' when frame 25 is in normal position illustrated in Fig. 1 and as the said frame swings either clockwise or anticlockwise about its axis said gears 30 and 31 come into full mesh with gears 11, 12 and 12' respectively.

This eccentric suspension is advantageous, as thereby the control element will be allowed to return to normal position with less resistance due to friction than if its gears 30 and 31 were continuously in full meshing connection with gears 11, 12 and 12'.

In order to continuously urge said frame 25 to so called normal position the frame ends 26 may each be formed with suitable lateral extensions 32 on opposite edges of said ends. Adapted to engage with each of said extensions is a spring actuated plunger 33 each of which latter is suitably pivoted to the frame 10 or mounted in any other desirable manner. The said plungers exert turning moments which tend to balance and retain the frame in a neutral position. By their pivoting arrangement it will be noted that as the frame 25 is swung counter to the spring force exerted by the plunger, the turning moment exerted by the said plunger diminishes differentially.

Now then, if the gears are braked and gear 11 is rotated in one direction or the other the teeth on gears 30 and 31 in the normal position being only slightly in mesh with gear 11 and the gears 12 and 12' will tend to clinch and thereby produce excessive wear on the respective teeth. It is desirable therefore, to provide means whereby the gears 30 and 31 will be prevented from rotation until the latter have been displaced angularly from the normal position together with frame 25 into the operative position to be presently described. It is therefore, necessary that gears 30 and 31 be locked against rotation during the interval when they are being displaced from said normal position to operating position, at which time because of the eccentric mounting of said frame said gears 30 and 31 will be in full mesh with gears 11, 12 and 12'. To permit the gears 30 and 31 and frame 25 to return to normal position as soon as rotation of gear 11 stops it is further necessary that said gears 30 and 31 remain free during their return period from said operating position to said normal position. The means I have provided for accomplishing this result is the same for each of said gears 30 and 31 so that I herein only describe the control of gear 30. The said means comprises a member 34 which is adapted to be mounted adjacent a frame end 26 and is provided with a suitable enlarged opening 35 for the passage therethrough of the shaft $a$. Formed on the lower edge of said member 34 or attached thereto is an engaging member 36 shown in the present instance as a toothed member which is so admeasured that when said frame is in normal position as shown in Fig. 1 said member 36 will engage teeth of gear 30. The said plate member 34 may be symmetrically formed relative to a line joining the centers of the axis of shaft $a$ and spindle 15 and said engaging member may be centrally located on the lower edge of said member 34. Symmetrically located on said member 34 are projecting pins 37 which latter are adapted to engage in suitable slots 38 formed in said frame end 26. The walls 38' of said slots may have a radii of curvature formed by using the centers of the respectively opposite pins and using proper radii. Thusly said member 34 may be pivoted about either one of said pins 37 without being capable of direct vertical or lateral displacement.

At the upper end of said member 34 is a slot 39 the radius of curvature of whose upper edge 39' is equal to or slightly greater than the distance between the center of the eccentric mounting ring and center of said spindle 15 plus one half the diameter of said spindle 15 and in describing the arc said eccentric center is used. The lower edge 39² of said slot is likewise described from said eccentric center. The spindle 15 passes through said slot.

The side edges 39³ and 39⁴ of said slot may be straight vertical lines. The distance between said side edges is so admeasured as to insure the fact that said engaging member 35 clears said gear 30 when said frame 25 is in operative position. Formed centrally along the lower edge of said slot 39 may be an upwardly projecting member 40 which is so admeasured in height as to permit said spindle 15 to pass between its upper end and said top edge 39′ of said slot.

Suitable retaining means for holding said member 34 in any set position as for instance spring actuated friction pins 41 mounted to frame 10 and adapted to engage said member are provided.

An identical member 34 serves to control gear 31.

The operation of said means in conjunction with my device is as follows:—

Assuming that the position shown in Fig. 1 is the normal position and that gears 12, 12′ are braked. Gears 30 and 31 are locked by engagement in their teeth of members 36 and consequently gears 12 and 12′ are also locked against rotation. Now then if shaft $a$ is rotated in clockwise direction gears 30 and 31 being locked, will swing with frame 25 in clockwise direction overcoming the braking action of brake gears 14 on gears 12 and 12′. During this period the members 34 will rotate and the spindle 15 will move along slot edge 39′ until it strikes the end 39³ thereof whereupon it will pivot members 34 about pins 37′ and cause members 36 to swing out of engagement with the teeth of gears 30 and 31. At the instant that gears 30 and 31 are released the brake discs 16 will be released by the nose 28′ striking the arm end 19′ and gears 30 and 31 will be completely free to run under the influence of the gear 11. As long as the shaft $a$ continues to revolve the frame 25 and gears 30 and 31 will remain out of normal position. Of course, just as soon as the brakes 14 are released, the gears 30 and 31 will begin to move towards their normal position, i. e. away from the arm end 19′, permitting nut 17 under the force of the springs 23 and 24 to move the brake discs 16 back into engagement with the gears 14 and hence again retard gears 12 and 12′ as a result of which the gears 30 and 31 will again rise causing the nose 28′ to actuate said arm end 19′ and so on. Thus as long as shaft $a$ continues to revolve in the same direction, the frame 25 and gears 30 and 31 will hover between their uppermost and normal positions, merely carrying out minute vibrations in vertical direction and hence remaining out of normal position. When the shaft $a$ comes to a full stop the frame 25 is instantly urged toward normal position by the spring actuated plungers 33. The gears 30 and 31 are free until they reach normal position at which instance the engaging members 36 reengage gears 30 and 31. This reengagement is caused by spindle 15 striking the members 40 and thereby pivoting said members 34 back into the position of Fig. 1. Fig. 1 and Fig. 3 show the normal and operating positions of the device.

Of course, if the shaft $a$ rotates in opposite direction the same sequence of events occur because of the symmetrical arrangement of members 34.

The invention herein described is of course applicable for all the purposes heretofore described in the aforenamed U. S. Patent as well as for many others which are apparent.

My invention may be modified in many ways without departing from the spirit thereof and I do not wish to be limited to the details shown and described.

What I claim is:—

1. In an automatic control of the character described, the combination with a driven rotary element of an oscillatory toothed rotary element, a gear on and revolving with said driven element, at least one other gear loose on said driven element, said oscillatory element being adapted to engage both said gears, means influencing the rotation of said loose gear so as to cause said oscillatory element to oscillate and be retained out of its normal position while said driven element is rotating and including means cooperating with said oscillatory element for actuating said first named means, and means for automatically returning said oscillatory element to its initial position after the rotation of said driven element ceases.

2. In a control device of the character described, the combination with a driven rotary element of a gear on and revolving with said driven element, at least one other gear loose on said driven element, means influencing the speed of rotation of said loose gear, a toothed element eccentrically suspended and capable of oscillation relative to the axis of said driven element and capable of revolving upon itself, said element being adapted to be constantly in engagement with said gears, so that when said driven element revolves in a certain direction said toothed element will be rotated about its center of suspension and gradually come into full mesh with said two gears, means on said toothed element suspension adapted to cooperate with said first named means when said toothed element is out of its normal position to release said loose gear and means for automatically returning said toothed element to normal position as soon as rotation of said driven element ceases.

3. In an automatic control of the character described, the combination with a driven rotary element, of an oscillatorily suspended rotary element, means fixed to and revolving with said driven element, rotary means loosely mounted on said driven element, said oscillatory element being adapted to engage said fixed and said loose means, means influencing the rotation of said loose means so as to cause said oscillatorily suspended element to oscillate and be retained out of its normal position while said driven element is rotating, means for positively locking said suspended rotary element from rotation until the latter has been oscillated to operating position, means for automatically returning said oscillatorily suspended rotary element to normal position when the driven element ceases rotating and means for positively locking said rotary element again only when the latter has again returned to said normal position.

4 In an automatic control of the character described, the combination with a driven spindle, of a fixed gear thereon, a loose gear thereon, an oscillatorily suspended element, freely revoluble toothed means carried by said element and capable of engaging both said gears, means influencing the rotation of said loose gear so as to cause said suspended element to oscillate and be retained out of its normal position while said driven spindle is rotating and including means carried by said suspended element for actuating said second named means, means for locking said toothed means against rotation until said suspended element has been oscillated to operating position, means for automatically returning said suspended element to normal position when rotation of said driven spindle ceases and means for again locking said toothed means only when the latter has returned to normal position.

5. In an automatic control of the character described, the combination with a driven rotary element, of an oscillatory element having rotary means for engagement with said driven rotary element, means whereby said oscillatory element will be oscillated and retained out of normal position while said driven element revolves in a certain direction, means for preventing rotation of said rotary means until said oscillating element has been oscillated into operating position, and means for automatically returning said oscillatory element to normal position, when said driven element stops.

6. In an automatic control of the character described, the combination with a driven rotary element of an oscillatory element having rotary means for engagement with said driven rotary element, means whereby said oscillatory element will be oscillated and retained out of normal position while said driven element revolves in a certain direction, means for locking said rotary means against rotation until said oscillatory element is in operating position and then releasing the former, means for automatically returning said oscillatory element to normal position when said driven element stops, and means for relocking said rotary means against rotation only when the oscillatory element returns to said normal position.

In testimony whereof I affix my signature.
HORACE F. STEVENS.